March 15, 1938.   H. KIPPENBERG   2,111,398
ANTENNA DEVICE
Filed March 21, 1935
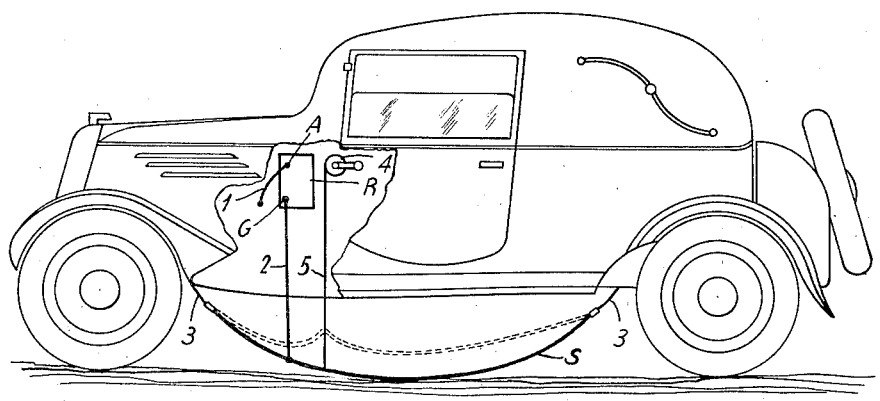
INVENTOR
HERMANN KIPPENBERG
BY
ATTORNEY Patented Mar. 15, 1938

2,111,398

UNITED STATES PATENT OFFICE 2,111,398

ANTENNA DEVICE

Hermann Kippenberg, Berlin, Germany, assignor to Telefunken Gesellschaft für Drahtlose Telegraphie m. b. H., Berlin, Germany, a corporation of Germany Application March 21, 1935, Serial No. 12,200
In Germany April 20, 1934

3 Claims. (Cl. 250—33)

The present invention is concerned with antenna arrangements in power vehicles, and the same has the object to facilitate and insure more particularly the reception of long distance signals in power vehicles.

An object of the invention is to provide an antenna arrangement which is especially adapted for mounting under a vehicle such as an automobile and which is adjustable vertically so that it may be lowered into contact with the surface of the ground.

A further object is to provide such an antenna which is flexible or yieldable and portions of which may move freely vertically with reference to the vehicle.

A still further object is to utilize such an antenna as the ground connection of a radio receiver mounted in the vehicle, the chassis or metal body of the car being the aerial or signal pick-up means.

It is known in the prior art that antenna wires may be installed in power propelled cars, and the like below the chassis or the running board. However, antennae of this kind are not located sufficiently spaced apart from the metallic parts of the car which serve as a counterpoise. As a result, only very low potentials arise between the two, and these are not always quite adequate for reception.

Now, according to this invention, one or more antenna ropes, cables or bands are so installed longitudinally underneath the car that they will touch the ground of the road wholly or nearly so. An arrangement as here disclosed acts in this manner, that the wire touching the soil or ground acts as an earth connection with the result that the receiving or signal pick-up means is the power propelled car itself, and the latter is insulated from the ground, as known, by the rubber tired wheels. When the ground is approached to within a small distance the grounding occurs capacitively. In this manner far better reception is feasible than with the antennae heretofore mostly employed which were in the form of frames or of wires stretched out on the roof. Preferably the wires stretched out under the vehicle capable of being lowered to contact the ground are provided with rubber insulation, and this insures mechanical protection of the conductor wire itself. A greatly preferable embodiment consists in that a rubber band or strip the width approximately of a hand is provided with a wire insert. It is likewise advisable to dispose the wires so that they may be reeled or wound up from the interior of the car so that, when necessary, no limitations may be imposed upon the car so far as its freedom of travel over certain grounds is concerned.

An embodiment of the invention is shown in the accompanying drawing in which an antenna or counterpoise S of the type described is suspended under the car by any suitable connecting means 3. The wire or conductor of S is shown connected to the ground terminal G of a radio receiver R mounted in the car as by a lead 2 while the metal chassis or body of the car is connected to the antenna terminal as by a lead 1. If desired, the counterpoise S may be raised or lowered with reference to the ground by any means such as a cord 5 which may be reeled onto a winch 4 suitably mounted near the receiver.

Having described my invention what I claim as novel and desire to secure by Letters Patent is:

1. In combination, a vehicle, a radio device mounted in said vehicle, said device having a ground terminal and an antenna terminal, a metallic counterpoise enclosed within a layer of insulation and suspended under said vehicle, at least a portion of said counterpoise being separated from the ground by an amount equal to the thickness of said insulation layer only, a connection between said counterpoise and said ground terminal and a connection between the metallic body portion of the vehicle and said antenna terminal whereby the metallic body portion serves as a radio signal pick-up means, and means in said vehicle for raising and lowering said counterpoise with respect to the ground.

2. In combination with a vehicle having a metallic body portion insulated from the ground, a metallic conductor enclosed within a thin layer of insulation and extending longitudinally under the vehicle, means supporting one end of said conductor near the front of said vehicle, means supporting the other end of said conductor near the rear of said vehicle, the center portion of said conductor being normally separated from the ground by said insulation layer only, a radio receiver mounted in said vehicle and having an antenna terminal and a ground terminal, a direct connection between said antenna terminal and the vehicle body portion and a direct connection between said metallic conductor and said ground terminal and means adjacent said receiver for raising and lowering said conductor.

3. In combination with an automobile having a metallic body portion, a radio device mounted in said automobile and having a pair of input terminals, a lead connecting said body portion to one of said terminals, a conductor enclosed within a thin layer of insulation material, means yieldably suspending said conductor under said automobile in the longitudinal direction thereof and for free vertical movement, a lead connecting said conductor to the other of said input terminals, a winding device mounted within said automobile and adjacent said radio device and a connection between said winding device and said conductor whereby said conductor may be raised or lowered to thereby change its capacity with respect to ground by a substantial amount.

HERMANN KIPPENBERG.